(12) United States Patent
Lee et al.

(10) Patent No.: US 6,771,688 B1
(45) Date of Patent: Aug. 3, 2004

(54) SEGMENTED ARCHITECTURE FOR MULTIPLE SEQUENCE DETECTION AND IDENTIFICATION IN FADING CHANNELS

(75) Inventors: Jung Ah Lee, Pittstown, NJ (US); Steven Andrew Wood, Hotwells (GB); Gregory J Wroclawski, Kinnelon, NJ (US); Woodson Dale Wynn, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 605 days.

(21) Appl. No.: 09/664,646

(22) Filed: Sep. 19, 2000

(51) Int. Cl.$^7$ ............................................. H04L 27/30
(52) U.S. Cl. ..................... 375/142; 375/143; 375/150; 375/152; 375/343
(58) Field of Search ................................ 375/140, 142, 375/143, 150, 152, 343; 370/335, 342, 441, 479

(56) References Cited

U.S. PATENT DOCUMENTS

| | | | |
|---|---|---|---|
| 5,579,338 A | * 11/1996 | Kojima | 375/149 |
| 5,627,855 A | 5/1997 | Davidovici | 375/207 |
| 5,715,276 A | 2/1998 | Tran et al. | 375/207 |
| 5,727,018 A | * 3/1998 | Wolf et al. | 375/149 |
| 5,764,691 A | 6/1998 | Hennedy et al. | 375/207 |
| 5,864,578 A | 1/1999 | Yuen | 375/200 |
| 5,872,808 A | 2/1999 | Davidovici et al. | 375/207 |
| 5,894,494 A | 4/1999 | Davidovici | 375/208 |
| 5,956,369 A | 9/1999 | Davidovici et al. | 375/207 |
| 6,005,889 A | * 12/1999 | Chung et al. | 375/140 |
| 6,005,899 A | * 12/1999 | Khayrallah | 375/343 |
| 6,028,887 A | 2/2000 | Harrison et al. | 375/206 |

FOREIGN PATENT DOCUMENTS

WO  WO 99/41846  8/1999 ............ H04B/1/707

OTHER PUBLICATIONS

Search Report.

* cited by examiner

*Primary Examiner*—Stephen Chin
*Assistant Examiner*—Dac V. Ha

(57) ABSTRACT

Known sequences are detected and identified in a fast fading environment using a segmented correlator and FHT (Fast Hadamard Transform) architecture. The incoming sequence of samples or data is segmented into blocks. Each block is individually detected using a correlator/FHT segment. Each sequence identifying output of each correlator/FHT segment is summed with the corresponding output of other correlator/FHT segments. Each sum is compared with a threshold to determine whether a particular sequence has been detected and identified.

5 Claims, 6 Drawing Sheets

SEGMENTED ARCHITECTURE FOR MULTIPLE SEQUENCE DETECTION AND IDENTIFICATION IN FADING CHANNELS

RELATED APPLICATION

Related subject matter is disclosed in the following application filed concurrently herewith: U.S. Patent Application entitled "Segmented Correlator Architecture For Signal Detection In Fading Channels", Ser. No. 09/66,551.

BACKGROUND OF THE INVENTION

1. Field of the Invention

The present invention relates to communications; more specifically, wireless communications.

2. Description of the Related Art

Wireless communications involve creating a voice or data communication channel between a mobile communication station and a base station. Setting up the communication channel typically involves the mobile station transmitting a known sequence on an access channel that is monitored by the base station. The base station detects the known sequence and uses it for functions such as estimating a timing difference between the mobile station and base station.

The signal transmitted by the mobile station to the base station over an access channel typically includes a known sequence based on one of M possible signature sequences comprising S symbols. In one such system, M=16 different signature sequences are available, where each signature sequence comprises S=16 symbols. UMTS W-CDMA uses length 16 Walsh-Hadamard sequences as signature sequences. These sequences are well known in the art and are described on pages 15–16 of 3GPP TSG RAN "Spreading and Modulation (FDD)," TS25.213 V3.2.b. Once one of the 16 symbol signature sequences is selected, it is used to generate a sequence that is transmitted to the base station. FIG. 1 illustrates how the transmit sequence is generated from a 16 symbol signature sequence. Sequence 10 represents a 16 symbol signature sequence with symbol periods 12, where each symbol is +1 or −1. Each of the 16 symbol periods is divided into C chip or sample periods 14, in this example C=256. As a result, the signature sequence comprises a total of K chip or sample periods, where K=4,096 (S=16 symbol periods×C=256 chip periods per symbol period). The signature sequence is used to generate interleaved sequence 18. The interleaved sequence comprises 256 (K/C) repeating periods 20, each with 16 (S) chip periods 22 for a total of 4,096 (K) chip periods.

The interleaved sequence is created by using the symbol values in the first chip period of symbol periods 0 through 15 of signature sequence 10 to populate the first 16 chip periods of repeating period 0 of interleaved sequence 18. The chip periods of repeating period 1 of interleaved sequence 18 are populated using the symbol values in the second chip periods of each of the 16 symbol periods of signature sequence 10. Similarly, the chip periods of repeating period 2 of interleaved sequence 18 are populated using the symbol values in the third chip periods of symbol periods 0 through 15 of signature sequence 10. This process continues until the 16 chip periods of the last repeating period (repeating period 255) are populated using the symbol values in the last chip period of each of the 16 symbol periods of signature sequence 10. As a result, interleaved sequence 18 consists of 256 repeating periods each containing 16 chip periods. Each of the repeating periods contains 16 chip periods having values equal to the value of one chip period from each symbol period of signature sequence 10. Therefore, a sample of symbol periods 0 through 15 of signature sequence 10 is contained in chips 0 through 15, respectively, of each repeating period of interleaved sequence 18.

The final step in generating a known sequence that is transmitted from the mobile station to the base station involves performing a chip period by chip period multiplication of interleaved sequence 18 with a 4,096 (K) chip period binary sequence 24. Binary sequence 24 is known and assigned to the particular base station with which the mobile will communicate. The result of the chip period by chip period multiplication is transmit sequence 26 which is then transmitted by the mobile to the base station.

The set of possible transmit sequences 26 is known by the base station that will receive the mobile transmission. The available signature sequences, the binary sequence and the interleave pattern are known, and as a result, the set of possible transmit sequences 26 is also known for each of the available signature sequences.

FIG. 2 illustrates a multiple signal detector used by the base station to identify and detect known sequences transmitted by a mobile station and received at the base station. Shift register 30 receives samples of the received sequence. Shift register 30 has 4,096 (K) locations in order to provide for 4,096 samples which correspond to the 4,096 chip periods that compose the received sequence. In order to account for the interleaving that was used to create the received sequence, a deinterleaving process is carried out while providing samples from shift register 30 to correlators 32, 34 and 36. It should be noted that the first chip period of each 16 chip long repeating period is provided to correlator 32. Similarly, the second chip period of each 16 chip long repeating period is provided to correlator 34. This process continues for a total of 16 correlators where the $16^{th}$ correlator or correlator 36 receives the last chip of each 16 chip long repeating period. This deinterleaving process provides each correlator with 256 chip period samples of a symbol period. Each of the correlators is provided with coefficients representative of a sequence of values associated with the 256 chip period values that represent a symbol. It should be noted that the sequence of coefficients provided to the correlator take into account the chip period by chip period multiplication that occurred between interleaved sequence 18 and binary sequence 24. The output provided by each correlator indicates how well the 256 chip period values from a symbol period match the sequence of chip period values that are expected for a +1 or −1 symbol. As a result, Fast Hadamard Transform (FHT) 40 receives an input from each of the 16 correlators where each input represents how well the 256 chip period values being examined by the correlator correspond to a symbol and whether that correspondence is to a +1 or −1 symbol.

FHT is well known in the art and are discussed in references such as "Fast transforms: algorithms, analysis, applications," pages 301–329, by D. Elliot and K. Rao, Academic Press, Orlando, Fla., 1982. FHT 40 is provided with coefficients that are used to identify which of 16 possible signature sequences are being received based on the outputs provided by the correlators. The FHT provides 16 outputs each corresponding to one of the possible signature sequences, where the magnitude of the output indicates how well the samples in shift register 30 matches each sequence. FHT 40 outputs are each provided to absolute value generator 42 which takes the absolute value or the square of the absolute value of the output for each FHT output. Each of the outputs of absolute value generator 42 is provided to thresholder 44 which compares the value from absolute value generator 42 with a predetermined threshold. When the value exceeds the threshold, a detection is declared and the received sequence is identified as corresponding to a particular signature sequence by the FHT output that produced the threshold-exceeding signal.

It should be noted that the base station attempts to detect the sequence over a period of time referred to as a search window. A search window is typically N times the sampling period of the received sequence. Once shift register 30 is filled with an initial set of samples, it shifts in new samples and shifts out older samples N−1 times. This results in N attempts to detect the expected sequence over a search window that is equal to N times the time period between samples provided to shift register 30. A detected sequence's position in the search window is determined by the number of shifts made by shift register 30 when one of the FHT's outputs corresponding to a signature pattern to be detected exceeds a threshold. The detected sequence's position in the search window is a measure of the round trip delay between the mobile station and the base station.

When the mobile station is in a fast moving motor vehicle or train, the signal supplied to the shift register is subjected to fast fading. As a result, the sequence received by the shift register is partially corrupted and produces a low FHT output. As a result, the FHT outputs that are compared with a threshold do not exceed the threshold and thereby result in a failure to detect or identify a received signature sequence.

SUMMARY OF THE INVENTION

The present invention provides detection and identification of known sequences such as sequences composed of Walsh-Hadarmard sequence and scrambling sequence in a fast fading environment using a segmented correlator and FHT (Fast Hadamard Transform) architecture. The incoming sequence of samples or data is segmented into blocks. Each block is individually detected using a correlator/FHT segment. Each sequence identifying output of each correlator/FHT segment is summed with the corresponding output of other correlator/FHT segments. Each sum is compared with a threshold to determine whether a particular sequence has been detected and identified.

DETAILED DESCRIPTION OF THE INVENTION

Figure 1:
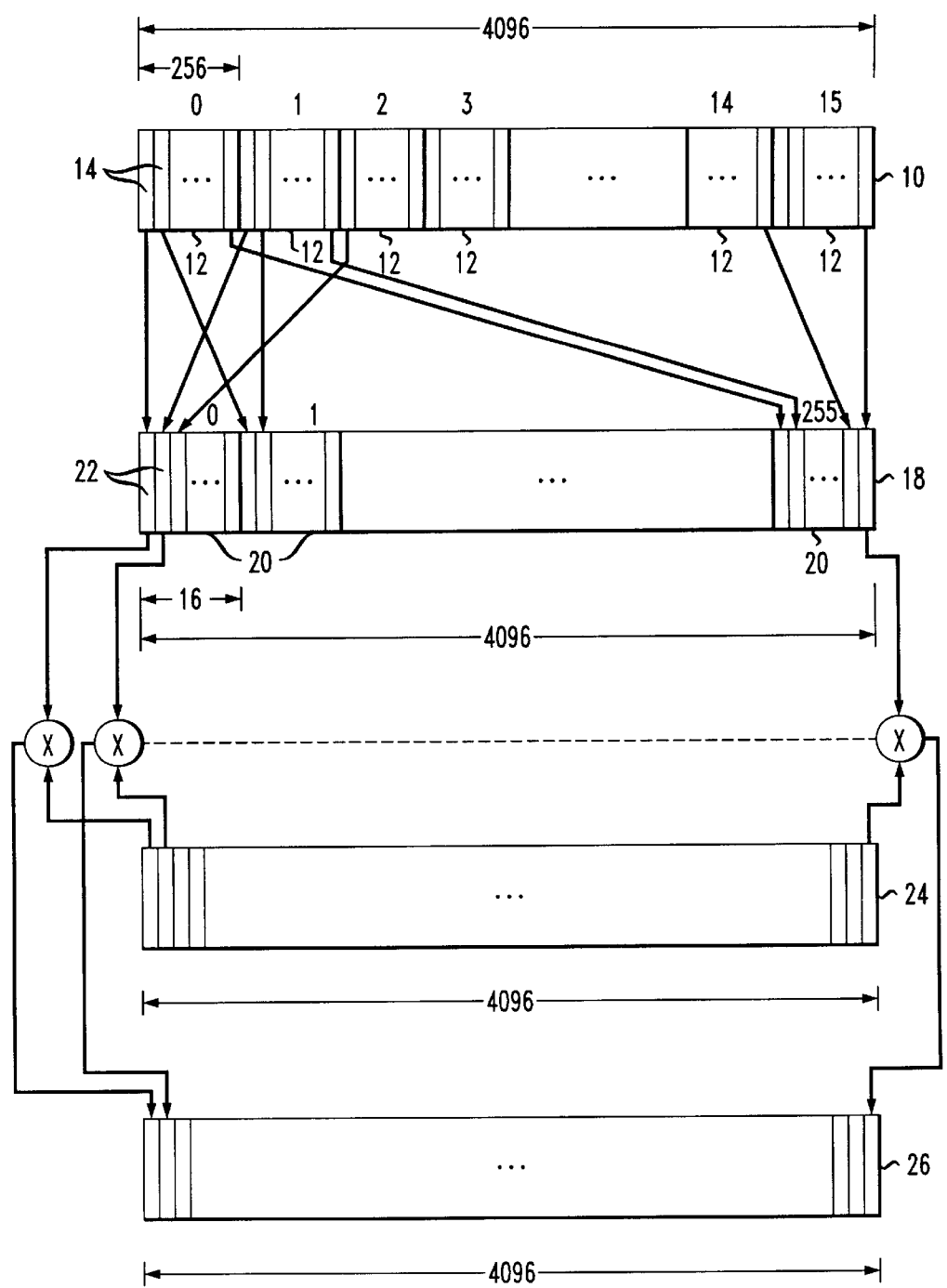
FIG. 1 illustrates how a signature sequence is used to generate a transmit sequence that is transmitted from a mobile station to a base station.
Figure 2:
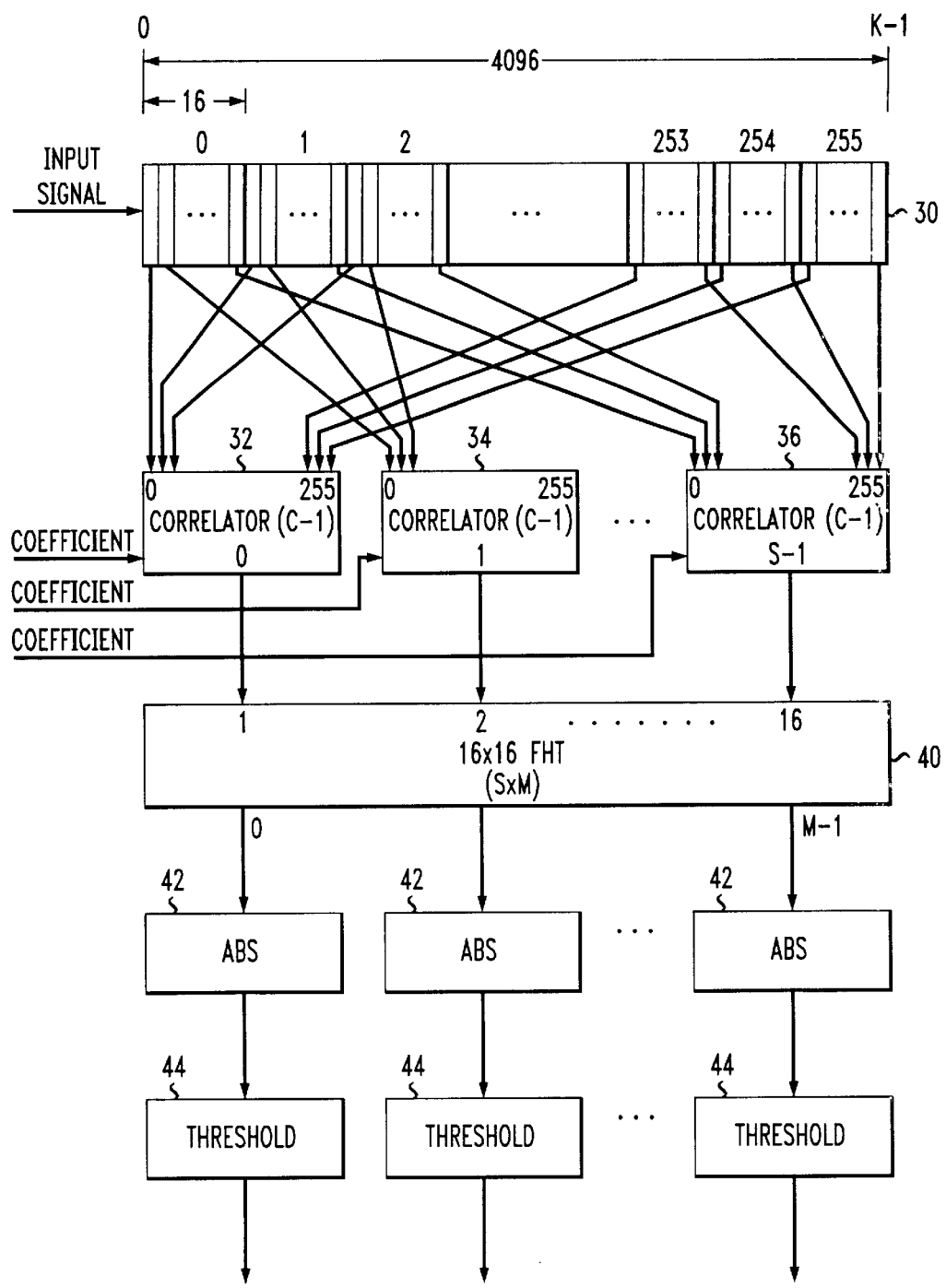
FIG. 2 illustrates a prior art signal detector and identifier.
Figure 3:
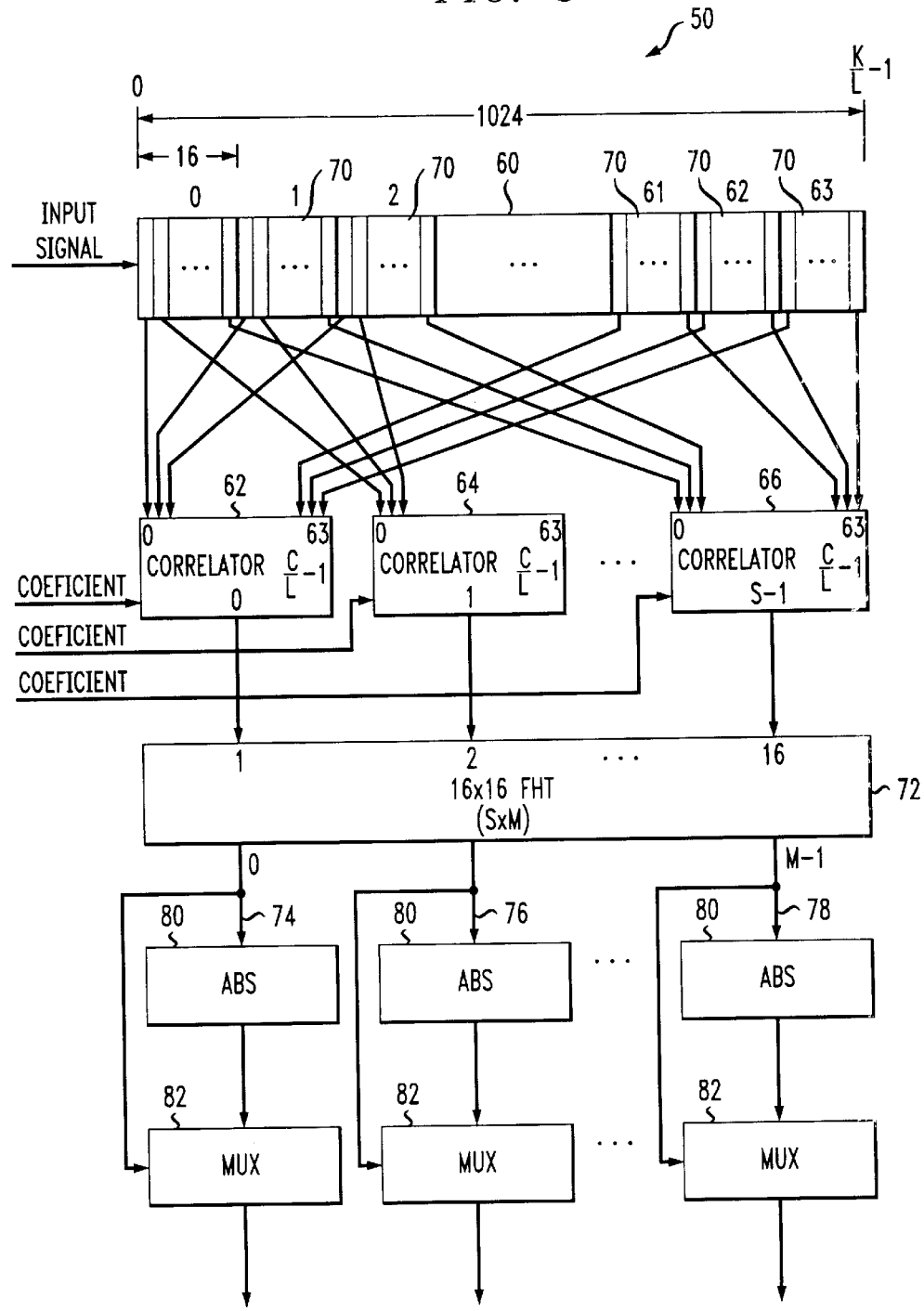
FIG. 3 illustrates a signal detector and identifier using a segmented correlator and FHT architecture.
Figure 4:
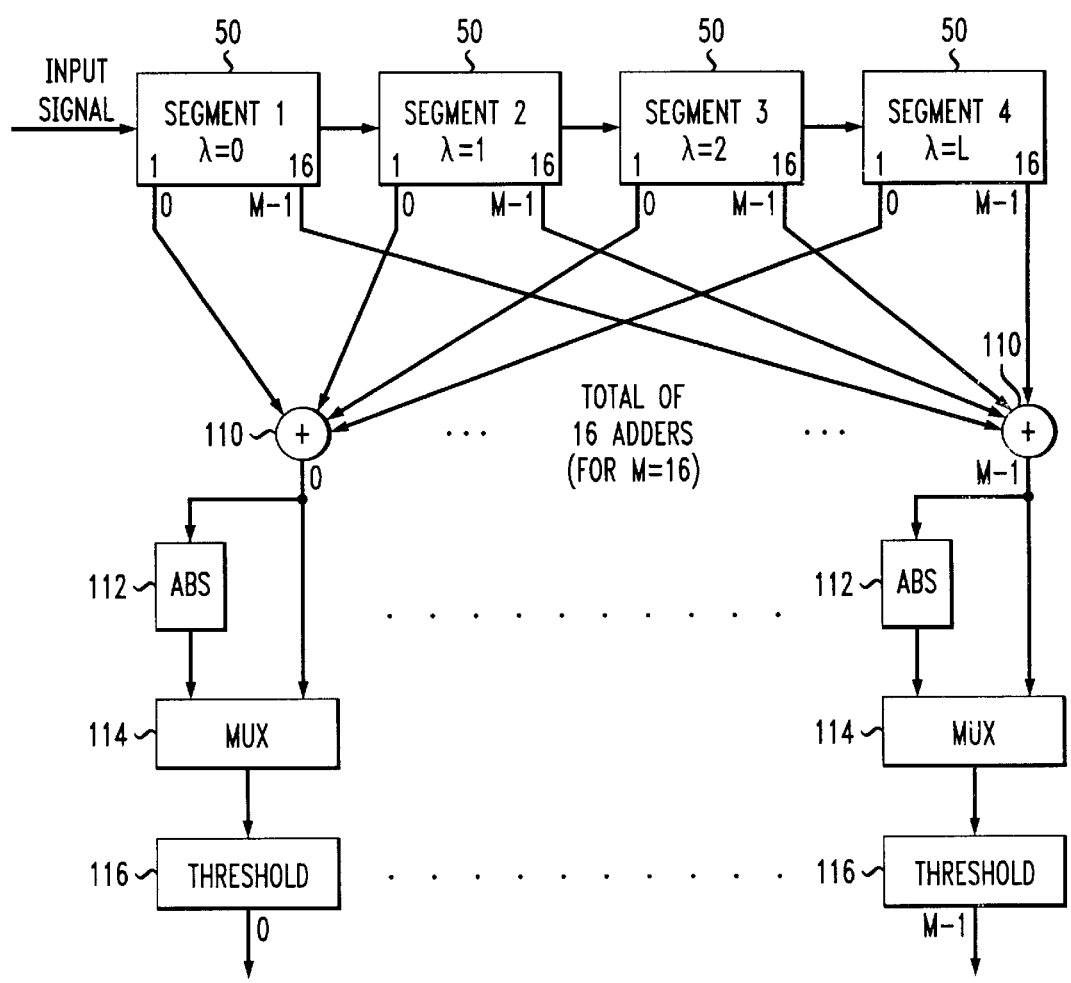
FIG. 4 illustrates combining the results of multiple segmented correlator and FHT outputs to produce a final output.

FIG. 3 illustrates a functional block diagram of correlator/FHT segment 50 of a segmented sequence detector/identifier. In this example, the signal detector/identifier comprises L=4 of the segments illustrated in FIG. 3. FIG. 4 illustrates the relationship among the L segments composing the detector/identifier. Each of the L segments receives K/L samples of the input signal, where K is the number of chip periods or samples composing the sequence. As new samples are shifted into the first segment, the oldest samples are shifted out of the first segment and into the second segment. Similarly, each of the remaining segments receives inputs from the prior segment and shifts out its oldest sample to the next segment.

The detection and identification process begins after an initial set of K samples of the input signal has been received (i.e., each segment has an initial set of K/L samples). Returning to FIG. 3, shift register 60 receives the initial or K/L (1024) samples of the received sequence, where L is the number of segments composing the detector/identifier and where K is the number of chips periods or samples composing the sequence received by a base station from a mobile station. (In this example, K=4096.) Other values of L may be used where larger values of L improve performance in a fast fading environment at the expense of increased hardware and/or processing. The received sequence in shift register 60 is deinterleaved and provided to correlators 62, 64 through 66. The deinterleaving is used to reverse any interleaving that was performed when the sequence was produced by the mobile station. The deinterleaving may be skipped if the transmitted sequence was produced without interleaving. It should be noted that only three correlators are shown, but in this embodiment 16 correlators of length 64 are used. Sixteen correlators are used in this example because it is assumed that the signature sequence contains S=16 symbols. Generally, the number of correlators should match the number of symbols (S) in the sequence to be identified, and the correlators should have a length of C/L, where C is the number of chip periods per symbol period in the signature sequence. In this example, C=256. Returning to the 16 symbol example, the first period chip value of each 16 chip long repeating period 70 is provided to correlator 62; the second chip period value of each 16 chip long repeating period 70 is provided to correlator 64; and in a similar fashion the remaining correlators are populated with input values until correlator 66 receives the last chip value of each 16 chip long repeating period 70. The coefficients or representative symbols provided to correlators 62, 64 and 66 are a C/L (64) chip value sequence that is expected when taking into account the chip period by chip period multiplication between the interleaved sequence and the base station associated binary sequence. Each correlator output indicates how well the C/L chip values provided to the correlator correspond to the sequence of chip period values that are expected for a +1 or −1 symbol. The symbol correlation outputs of correlators 62, 64, and 66 are provided to 16×16 (S×M) FHT 72, where S is the number of symbols in a signature sequence and M is the number of different signature sequences that may be received. Based on the outputs from the correlators, FHT 72 provides an output value on each of its 16 (M) signal identity outputs indicating how well the signal represented by the symbol correlation inputs from the correlators correspond to each of 16 (M) possible signature sequences. For example, output 74 indicates how well the sequence in register 60 corresponds to a first signature sequence. Similarly, output 76 indicates how well the sequence in register 60 corresponds to a second signature sequence. Finally, output 78 indicates how well the sequence in register 60 corresponds to a sixteenth ($M^{th}$) signature sequence. It should be noted that if M possible signature sequences are to be identified, an M output FHT should be used. Additionally, it is desirable for the number of symbols S to equal M. Returning to FIG. 3, each FHT or signal identifying output is provided to an absolute value generator 80 and multiplexer 82. Absolute value generator 80 generates either the absolute value or square of the absolute value of the output from FHT 72, and provides that value to multiplexer 82. Multiplexer 82 selects between the output of FHT 72 and the output of absolute value generator 80. The output of absolute value generator 80 is selected when the signal detection is being attempted in a fast fading environment. The output of FHT 72 is selected when signal detection is being attempted in a less severe fading environment. The outputs of multiplexers 82 are combined as illustrated in FIG. 4.

FIG. 4 illustrates the manner in which L=4 correlator/FHT segments 50 are combined to provide a segmented sequence detector/identifier. Each segment 50 corresponds to a correlator/FHT segment as shown in FIG. 3. Each segment 50 provides 16 (M) signal identifying outputs where each output is associated with a particular signature sequence. The outputs from segments 50 are summed in summers 110, where each summer sums a group of outputs associated with a particular signature sequence. In this example, there are 16 (M) possible signature sequences, therefore there are 16 summers 110; however, to simplify the figure only two summers are shown. The output of each summer 110 is provided to an absolute value generator 112 and a multiplexer 114. The absolute value generator generates the absolute value or the square of the absolute value of the outputs produced by summer 110. The output of absolute value generator 112 is then provided to multiplexer 114. Multiplexer 114 is used to select between the outputs of adder 110 and the output of absolute value generator 112. In a fast fading environment, multiplexer 114 is used to select the output of adder 110. In a less severe fading environment, multiplexer 114 is used to select the output of absolute value generator. The output of multiplexer 114 is provided to thresholder 116 which compares the multiplexer output to a predefined threshold. There are 16 (M) thresholders 116, one associated with each signature sequence. When one of the thresholders indicates that its input has exceeded the predetermined threshold, the signature sequence associated with that thresholder is detected and identified.

The input signal is shifted through segments 50 via input shift registers 60 and examined to attempt detection/identification of the known or expected sequence until a search window of N input signal sample periods has been examined. This is accomplished by examining the initial K samples of the input signal and then examining each of the following N−1 new sets of K samples. A new set of K samples is produced each time shift registers 60 shift in a new input signal sample and shift out the oldest sample. A detected/identified sequence's position in the search window is determined by the number of shifts made by shift registers 60 when a thresholder 116 detects that a threshold has been exceeded.

Figure 5:
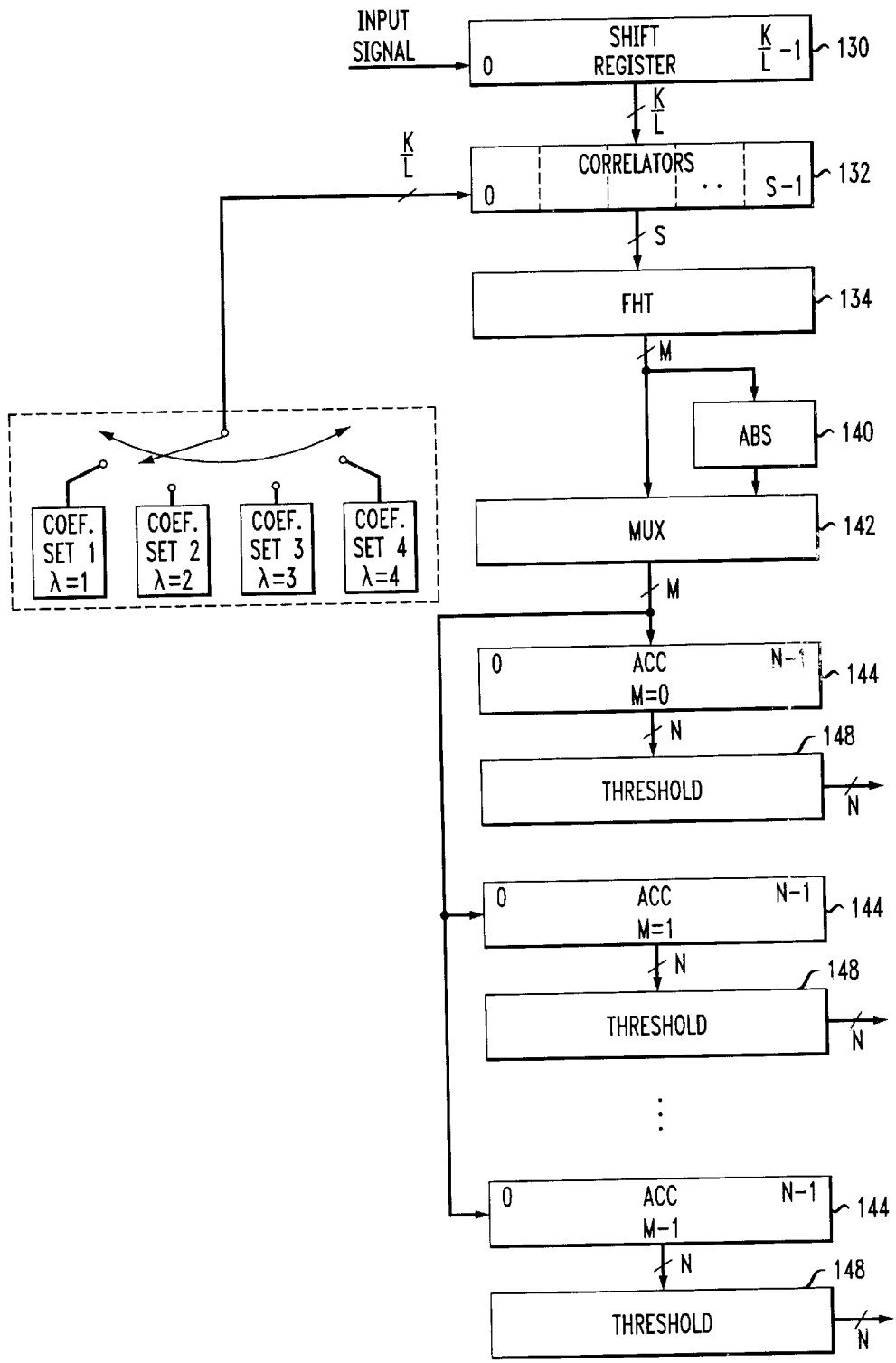
FIG. 5 illustrates a time multiplexed segmented correlator and FHT architecture.

FIG. 5 illustrates a detector/identifier architecture using a time-multiplexed segmented architecture. In this example, the search window is N sample periods long and N is less than or equal to K/L, where the input sequence of K samples is segmented into L segments of length K/L Input shift register 130 shifts the data from left to right N−1 times for each segment and thereby provides N sets of K/L samples to correlators 132. In this example, the sequence is composed of S symbols, where each symbol comprises C chip periods. Therefore, it is desirable to use S correlators, each with a length of C/L. This results in correlators 132 producing N sets of S symbol correlation outputs for each segment. In this example, since there are L different segments, L different sets of coefficients are provided to correlators 132, where each set of coefficients is representative of an expected sequence segment or sequence of representative symbols. When the first segment is provided to correlators 132, the first set of K/L coefficients is also provided to the correlators. In a similar fashion, when the second segment of K/L samples is provided to correlators 132, the second set of K/L coefficients is provided to the correlators. This process continues until the last or $L^{th}$ segment of samples is provided to correlators 132. For each segment, each of the N sets of S outputs from correlators 132 are provided to FHT 134. FHT 134 is an S×M FHT, where M is the number of possible signature sequences to be identified. Each of FHT 134's M outputs indicate how well a sequence or signal, as represented by the S outputs of correlators 132, match one of the M possible signature sequences or expected sequences. As a result, for each segment, N sets of M signal identity outputs from FHT 134 are provided to both absolute value generator 140 and multiplexer 142. As discussed earlier, absolute value generator 140 may take the absolute value or the square of the absolute value of the output of FHT 134. When performing signal detection in a fast fading environment, multiplexer 142 selects the output of absolute value generator 140 and provides it to accumulators 144. In a less severe fading environment, multiplexer 142 selects the output of FHT 134 and provides it to accumulators 144. A separate accumulator 144 is provided for each of the M outputs received from multiplexer 142. This results in a separate accumulation being used for each of the M possible signature sequences. Recalling that there are N sets of M outputs produced for each of the L segments, N separate accumulations are produced and stored in each accumulator 144, where each of the N accumulations is associated with a different position in the search window. As a result, if the input data stream is broken into L segments, each accumulator 144 accumulates L values in each of the separate N accumulations. After L values have been accumulated in each of the N accumulations, the outputs of accumulators 144 are provided to thresholders 148. There are M thresholders 148. Each thresholder corresponds to a different one of the M possible signature sequences. A signature sequence is identified by which of the M thresholders indicate that a threshold has been exceeded. Additionally, an identified sequence's position in the search window is indicated by which of the N accumulations exceeded the threshold. After accumulation is completed for the L segments and after all N accumulations have been compared to a threshold, accumulators 144 and shift register 130 are cleared and the process is repeated at the beginning of the next signal reception period.

Figure 6:
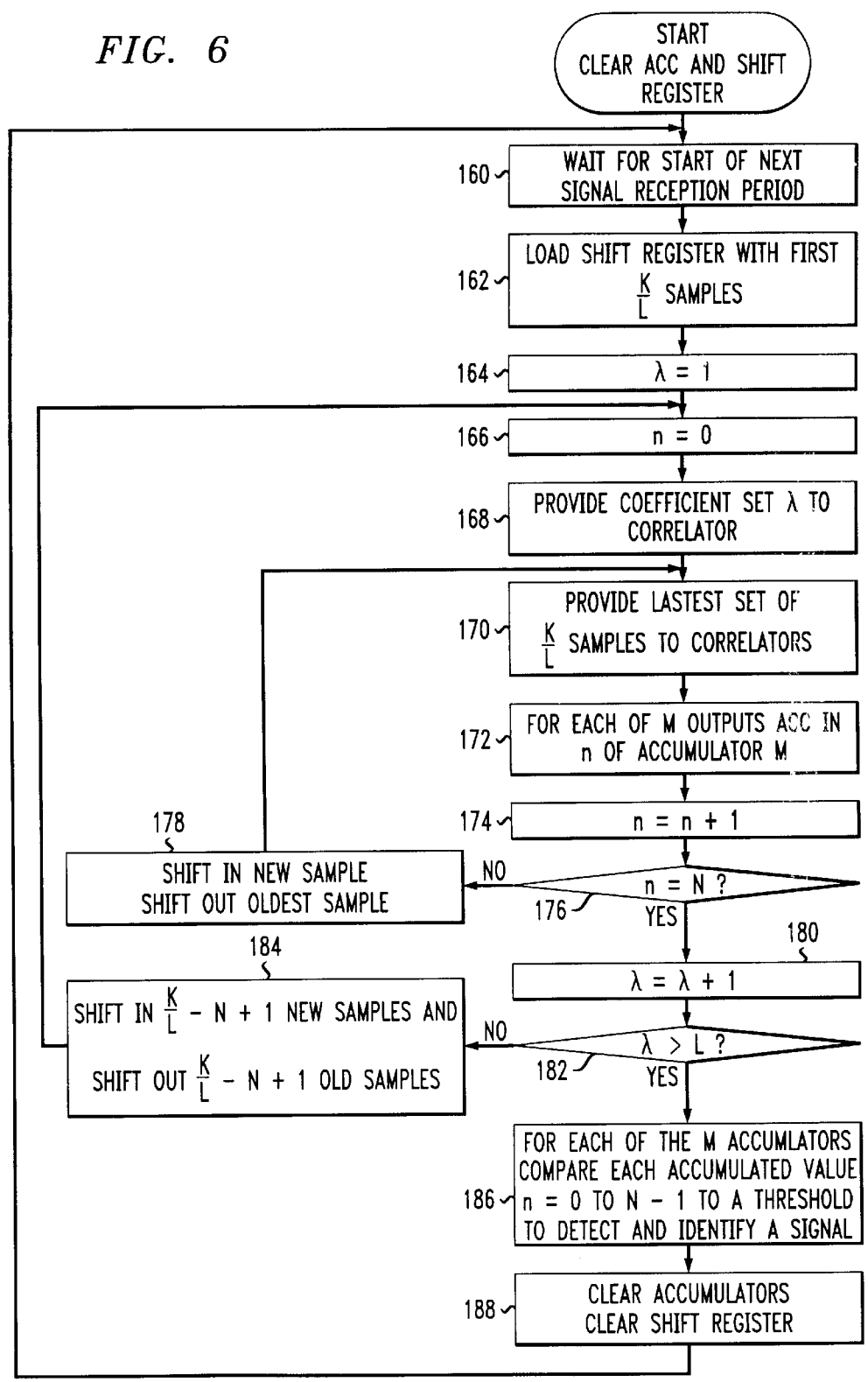
FIG. 6 is a flowchart of signal detection and identification using a time multiplexed segmented correlation and FHT architecture.

FIG. 6 is a flowchart illustrating how signal detection and identification are accomplished using the time-multiplexed architecture of FIG. 5. Initially, accumulators 144 and shift register 130 are cleared. In step 160, the process waits for the start of the next signal reception period of the base station. When the signal reception period begins, step 162 is executed where shift register 130 is loaded with the first K/L samples of the input signal. In step 164 index λ is set equal to 1 and in step 166 index n is set equal to 0. In step 168, coefficient set λ is provided to correlators 132. In step 170 the latest set of K/L samples from shift register 130 is provided to correlators 132. After the resulting symbol correlation outputs from correlators 132 is provided to FHT 134, the M outputs of FHT 134 are provided to absolute value generator 140 and multiplexer 142. The M symbol identity outputs of multiplexer 142 are provided to M accumulators 144, where in step 172 each accumulator receives one of the M outputs and adds it to accumulation n. In step 174 index n is set equal to n+1. In step 176 it is determined whether index n is equal to N which is the number of sample periods in the search window. If index n is less than N, step 178 is executed where a new sample of the input signal is shifted into shift register 130 while the oldest sample is shifted out of the shift register. After step 178, step 170 is executed where the latest set of K/L samples from shift register 130 is provided to correlators 132. This process continues until N sets of K/L samples have been examined and until each set of M results have been stored in their corresponding n accumulation in accumulators 144. When N sets of input samples have been evaluated, step 176 determines that n=N and step 180 is executed. In step 180 index $\lambda$ is set equal to $\lambda$+1. In step 182 it is determined whether index $\lambda$ is greater than L. If index $\lambda$ is not greater than L, step 184 is executed to provide shift register 130 with the next segment for examination. In step 184, K/L−N+1 new samples of the input signal are shifted into shift register 130 while K/L−N+1 old samples are shifted out of the shift register. After step 184, step 166 is executed where index n is set equal to 0, and step 168 is executed where correlators 132 are provided with the next set of coefficients to be used. As with the prior segment, N sets of K/L samples are examined to produce N sets of M outputs that are accumulated in the N separate accumulations in M accumulators 144. Returning to step 182, if it is determined that $\lambda$ is greater than L, step 186 is executed. Since index $\lambda$ is greater than L, all of the segments associated with the input signal have been examined. In step 186, each of the N accumulations of L values, in each of M accumulators 144 is compared to a predefined threshold in thresholders 148 to determine if a known signal or sequence has been detected. A signal or sequence is identified by which of the M thresholders indicates that a threshold has been exceeded. The particular accumulation n (where n may equal 0 to N−1), that exceeds the threshold determines the detected signal's position in the search window. After step 186, step 188 is executed where accumulators 144 and shift register 130 are cleared. Step 160 is then executed where the process once again waits for the beginning of the next signal reception period of the base station.

It should be noted that the architectures illustrated in FIGS. 3 through 5 may be carried using individual circuits associated with each block, applications specific integrated circuit (ASIC) or a general purpose processor such as a digital signal processor (DSP) that performs the functions illustrated by the functional block diagram.

The invention claimed is:

1. A method of detecting and identifying a received signal including a plurality of symbols, each symbol comprising a plurality of chips, the method comprising the steps of:

segmenting the received signal into at least a first and a second segment, each segment having at least one chip from each of the plurality of symbols;

correlating each of the plurality of symbols represented by the at least one chip in the at least first and second segments with a representative symbol to produce at least a first and a second set of a symbol correlation outputs;

producing at least a first and a second set of signal identity outputs, the first set of signal identity outputs indicating a degree of match between a first signal represented by the first set of symbol correlation outputs and each of a plurality of expected signal intensities, and the second set of signal identity outputs indicating a degree of match between the second signal represented by the second set of symbol correlation outputs and each of the plurality of expected signal identities;

summing corresponding signal identity outputs from the at least first and second sets of signal identity outputs to form a plurality of summed signal identity outputs; and comparing each summed signal identity output to a threshold to detect and identify the received signal.

2. The method of claim 1, further comprising the step of deinterleaving at least one of the segments.

3. The method of claim 1, wherein the representative symbol is the same for at least two symbols.

4. The method of claim 1, wherein the threshold is the same for each summed signal identity output.

5. A method of detecting and identifying a received signal comprising the steps of:

segmenting the received signal into at least a first and a second segment, each having at least two symbols;

correlating each of the symbols the at least first and second segments with a representative symbol to produce at least a first and a second set of a symbol correlation outputs;

producing at least a first and a second set of signal identity outputs, the first set of signal identity outputs indicating a degree of match between a first signal represented by the first set of symbol correlation outputs and each of a plurality of expected signal intensities, and the second set of signal identity outputs indicating a degree of match between the second signal represented by the second set of symbol correlation outputs and each of the plurality of expected signal identities;

summing corresponding signal identity outputs from the at least first and second sets of signal identity outputs to form a plurality of summed signal identity outputs; and comparing each summed signal identity output to a threshold to detect and identify the received signal, wherein the threshold is the same for each summed signal identity output.

\* \* \* \* \*